Figure 1:
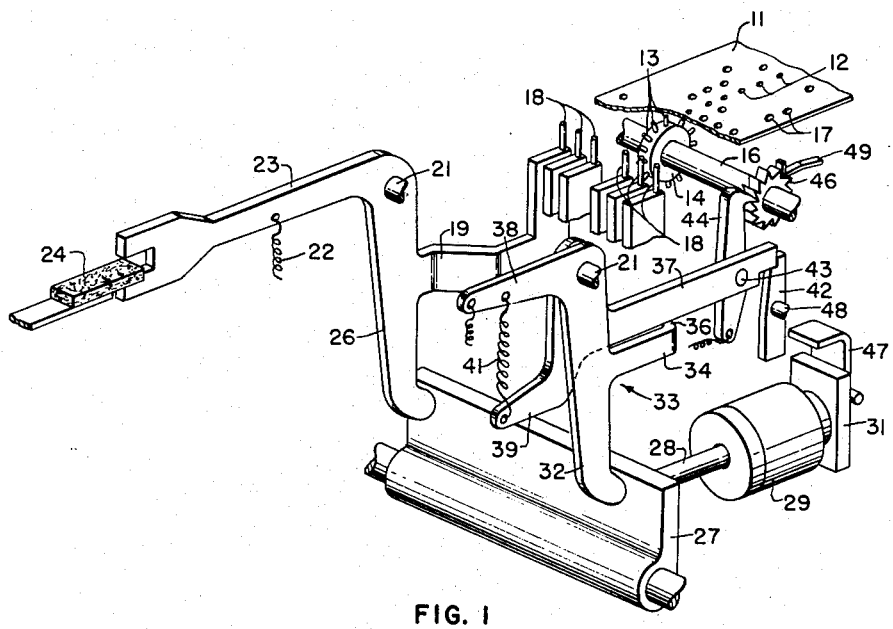

Feb. 21, 1956     W. J. ZENNER     2,735,888

TAPE FEEDING DEVICE

Filed Sept. 5, 1952

INVENTOR
WALTER J. ZENNER
BY *Emery Robinson*
ATTORNEY

United States Patent Office 2,735,888
Patented Feb. 21, 1956

2,735,888
TAPE FEEDING DEVICE

Walter J. Zenner, Des Plaines, Ill., assignor to Teletype Corporation, Chicago, Ill., a corporation of Delaware Application September 5, 1952, Serial No. 308,135

8 Claims. (Cl. 178—17)

This invention relates to a tape feeding device and more particularly to a tape feeding device operative in conjunction with a tape sensing apparatus wherein the operation of the tape feeding device is rendered instantaneously operative upon completion of a sensing operation.

In the tape sensing and feeding devices, presently available, the movement of the sensing elements following completion of a sensing operation continues during the period of operation of the elements comprising the tape feeding means. The usual practice employed being to associate the tape feeding elements with the tape sensing elements so that the tape feeding operation is made ancillary to the operation of the tape sensing means. More specifically, the power for operating the tape feeding means is derived from the power means utilized to operate the tape sensing means, hence it becomes comprehendable that the power means for operating the sensing means must continue to function during the operation of the tape feeding means.

It may be understood that the operation of the tape feeding means in a manner subservient to the operation of the sensing means requires for proper operation the continuous operation of the power source utilized to actuate the tape sensing means. Generally, the result of such operation is the withdrawal of the sensing elements a distance further from the tape than is necessary to allow the tape to be advanced. In order to effect a sensing operation utilizing the prior art devices, it has become necessary to impart a considerable amount of travel to the sensing elements which is unnecessary and the result is that the sensing elements have imparted thereto sufficient momentum to pass through or strike the tape with a considerable force. Oftentimes in such operation when the elements elements strike nonperforated sections of the tape said points of impact tear or fracture resulting in a mutilation of the tape rendering it unsuitable for further use. Obviously, as the tape is torn by the movement of the pins, any subsequent use of the tape will provide a false indication. Another disadvantage of having the sensing means pass through the apertures in the tape with excessive force is that the sensing elements engage the edges of the perforations to tatter and fray these edges hence rendering the tape unreliable for future use.

A further aspect to be considered in the use of these standard tape sensing and feeding devices wherein the sensing elements continue to move out of engagement with a tape during feeding operations is that the overtravel is wasted motion.

It is a primary object of the present invention to provide a tape feeding and sensing device wherein the sensing elements do not move during operation of the tape feeding elements.

An object commensurate with the primary object is the provision of a tape sensing and feeding device wherein the tape feeding means is not operated during withdrawal of the sensing elements from the tape.

It is a further object of the invention to provide a tape feeding and sensing device wherein the movement of the sensing elements is utilized to store energy which is later converted to kinetic energy and employed to operate the tape feeding elements.

Another object of the invention is to eliminate overtravel of the sensing elements during operation of a tape feeding device and thereby allow increased operating speeds for the over-all operation of the tape sensing and feeding device.

An additional object of the invention is the provision of a tape sensing and feeding device wherein overtravel of the sensing elements is eliminated and the possibility of the sensing elements impairing the character of the signal indicia formed in the tape is substantially reduced.

The present invention is described and disclosed in relation to a tape feeding and sensing device of the general type disclosed in Teletype Bulletin No. 103, Issue 2, issued October 1938, by the Teletype Corporation of Chicago, Illinois. It is to be clearly understood, however, that many other types of tape sensing devices could be modified or adapted to incorporate the principles enumerated in the present description of the invention.

With these and other objects in view the present invention contemplates a tape sensing unit comprising a plurality of sensing elements which are periodically released and permitted to probe and ascertain the presence or absence of permutatively perforated indicia formed in a telegraph message tape. The tape is advanced in one step increments through the apparatus to successively present transverse rows of permutative apertures to the sensing elements. Subsequent to each sensing operation the sensing elements are withdrawn from the tape and simultaneously therewith a lever is pivoted to extend a spring. Upon complete withdrawal of the sensing elements from the tape a latch is released to allow the extended spring to supply the necessary energy for the actuation of a tape feeding device.

Figure 2:
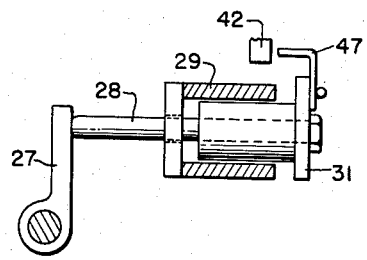

Other objects and advantages of the present invention will be apparent from the following detailed description when considered in conjunction with the accompanying drawing, wherein:

Fig. 1 is a perspective view of a tape sensing and feeding device embodying the principal features of the present invention; and Fig. 2 is a side elevational view partially in section illustrating a solenoid for operating the tape feeding and sensing device shown in Fig. 1.

Referring to Fig. 1, there is disclosed a tape sensing device adapted to receive a message tape 11 from any well known apparatus for preparing said tape such as a perforator or a reperforator. The elements comprising the sensing device and the manner in which it is used to control the generation of telegraph signals is only described in the present description in a broad manner and for a more detailed description of the tape sensing device and the apparatus controlled thereby the readers attention is directed to the afore-identified Teletype Bulletin No. 103. The tape utilized has formed therein a row of evenly spaced longitudinal holes 12 which are adapted to be engaged by a plurality of pins 13 formed on a feed wheel 14 secured to a shaft 16. In transverse alignment with each feed hole 12 is a set of permutative apertures 17 which are representative of signals which are to be transmitted to distant receiving stations by apparatus (not shown) associated with the tape sensing device.

A plurality of transversely aligned sensing pins 18 are mounted on a like number of sensing members 19 pivotally mounted about a rod 21. Each of the sensing members is urged towards the tape or in a counterclockwise direction by individual springs 22 connected to trailing arms 23 formed integral with each sensing member 19. Each trailing arm 23 is bifurcated at its free end to accommodate within the bifurcations a contact element 24.

The contact elements 24 are each connected to and control a telegraph transmitter distributor (not shown) of any well known type.

Holding the sensing members from movement towards the tape is a depending arm 26 formed integral with each of the sensing members 19 and adapted to engage a bail 27. Maintaining the bail 27 in position is a thrust rod 28 (Figs. 1 and 2) adapted to engage the bail and positioned for reciprocating movement within the coil of electromagnet 29. Movement of the thrust rod 28 is controlled by an armature 31 connected thereto which armature is in turn controlled in position by the energization and de-energization of the electromagnet 29.

Also engaging the bail 27 on its forward face is an operating arm 32 forming one arm of a three arm member generally designated by the reference numeral 33. An arm 34 of the three arm member 33 is bent to form a detent 36 which underlies a feed lever 37 pivotally mounted on the rod 21. The three arm member 33 is also pivotally mounted on the rod 21. Extending between a third arm 38 of the three arm member 33 and an extension 39 of the feed lever 37 is tension spring 41 adapted to urge the detent 36 into engagement with the feed lever 37. Movement of the feed lever 37 with the three arm member 33 is precluded by means of a latch 42 having a notch formed therein adapted to engage a recessed terminus of the feed lever 37. There is also mounted on the feed lever 37 by means of a pivot pin 43 a pawl 44 adapted to be spring urged into engagement with a ratchet 46 secured to the shaft 16.

Referring to Figs. 1 and 2, there is disclosed a trip 47 connected to the armature 31 and adapted to engage the latch 42 upon a movement of the armature to pivot the latch about a stud 48.

In operation of the device, the electromagnet 29 is periodically energized by any suitable source of oscillating current which may be controlled by any well known circuit-breaker-maker device. Energization of the electromagnet 29 attracts the armature 31 to move the thrust rod 28 toward the left as viewed in Figs. 1 and 2 and as a result the bail 27 is pivoted in a counterclockwise direction. Movement of the bail 27 is imparted to the depending arms 26 to pivot the sensing members 19 about the rod 21 in a clockwise direction. Movement of the sensing levers 19 withdraws the sensing pins 18 from within any apertures 17 formed in the tape 11 or from engagement with nonperforated portions of the tape. Movement of the depending arms 26 is also imparted to the trailing arms 23 to move the contact elements 24 downwardly into engagement with contact elements (not shown) to impress a marking or current condition to the transmitter distributor in a fashion well known in the telegraph art.

Counterclockwise movement of the bail 27 is also imparted to the operating arm 32 of the three arm member 33 causing said member to pivot in a clockwise direction about the rod 21 and consequently the arm 38 pivots to extend the tension spring 41. The force of the extended spring 41 is ineffective to pivot the feed lever 37 because said feed lever is maintained in position through the instrumentality of the latch 42. As the pins 18 are fully withdrawn from the tape 11, the trip 47 is moved into engagement with the latch 42 to pivot the latch about the stud 48 and thereby release the feed lever 37. Immediately thereafter the extended spring 41 is rendered effective to pivot the feed lever 37 about the rod 21 until it again strikes the detent 36. Pivotal movement of the feed lever 37 is imparted to the pawl 44 and obviously the advance of the pawl 44 causes the ratchet 46 to advance one increment. An anti-backlash spring biased lever 49 is provided to prevent override or retrograde movement of the ratchet 46.

Upon de-energization of the electromagnet 29, the thrust rod is returned to the initial position shown in Figs. 1 and 2 and as a result the bail 27 pivots in a clockwise direction under the impetus of the extended springs 22 connected to each of the trailing arms 23. The sensing levers 19 thereupon move upwardly to probe the tape 11 and thus pins 18 which are in register with the apertures 17 in the tape 11 pass therethrough to position the sensing levers 19 and the trailing arms 23 in a permutative fashion in accordance with the permutation of apertures 17. The contacts 24 are accordingly positioned and thus the transmitter distributor is permutatively energized in accordance with the permutations of apertures in the message tape. The return movement of the operating arm 32 causes the three arm member 33 to pivot about the rod 21 and as a result the arm 34 and the detent 36 pivot to return the feed lever 37 to the initial position. Movement of the feed lever 37 is imparted to the pawl 44 to advance the pawl over one tooth of the ratchet 46 and thus condition the apparatus for the next cycle of operation.

In summation it may be appreciated that the sensing levers do not move in any substantial degree during the operation of the tape feeding device because the tape feeding device instantly operates upon withdrawal of the sensing pins 18 from the tape 11. It may be further appreciated that the travel of the pins 18 is only of a sufficient degree to withdraw the pins 18 from the tape 11 and do not continue during the operation of the tape feed mechanism.

It is to be understood that the above-described arrangement and construction of elemental parts is simply illustrative of the application of the principles of the invention and many other modifications may be made without departing from the spirit and scope of the invention.

What is claimed is:

1. In a tape feeding device, means for advancing a tape, energy storing means connected to and adapted to operate the advancing means to advance the tape, and cyclically operable means for actuating the energy storing means to store energy and subsequently release the storing means to apply the stored energy to operate the tape advancing means to advance the tape.

2. In a tape sensing and feeding device, a plurality of sensing elements, means for moving the sensing elements into and out of a sensing position, means for feeding tape past the sensing portion, means for holding the tape feeding means from operation during movement of the sensing elements out of the sensing position, means operated by the moving means connected to the tape feeding means for storing energy during movement of the elements out of the sensing position, and means operated by the moving means for releasing the holding means whereupon the stored energy operates the tape feeding means to feed the tape past the sensing position.

3. In a tape feeding device, means for advancing a tape, a member adapted to operate the tape advancing means to advance the tape, a spring connected to the member, means for holding the member, cyclic means for extending the spring while the member is held by the holding means, and a trip operated by the cyclic means for releasing the holding means after the spring is extended whereby the extended spring moves the member to operate the tape advancing means to advance the tape.

4. In a device for advancing tape, tape engaging means, pawl means for advancing the engaging means, cyclically operable means for moving the pawl means from a predetermined position to advance the engaging means, means for latching the pawl means in said predetermined position, energy storage means connected to the pawl means, means operated by the cyclically operable means for storing energy in the storage means, and operated by the cyclically operable means, means for releasing the latching means to release the stored energy to operate the advancing means to advance the tape.

5. In a device for feeding tape, tape advancing means, an operating arm for actuating the advancing means, a latch for holding the operating arm, a second arm, a spring interconnecting the arms, cyclically operable means for oscillating the second arm to cyclically extend the spring, and means for releasing the latch when the spring is extended whereby the operating arm is moved to actuate the tape advancing means.

6. In a tape sensing and feeding device, a plurality of sensing members, means for engaging the tape, means for advancing the engaging means to advance the tape, latching means adapted to prevent the operation of the advancing means, and means for moving the sensing means into and out of sensing position, said moving means being effective to release the latching means as soon as the sensing means is moved from the sensing position.

7. In a tape feeding device, a feed wheel, a ratchet connected to the feed wheel, a pawl adapted to cooperate with the ratchet, a first lever connected to and adapted to actuate the pawl, a second lever, a spring interconnecting the levers, means for latching the first lever in position, means for moving the second lever to extend the spring, said moving means being effective to release the latch to allow the first lever to move under the influence of the extended spring to actuate the pawl to advance the ratchet and feed wheel.

8. In a tape sensing and feeding device, a plurality of sensing levers, a bail engaging the sensing levers, a solenoid operated plunger for oscillating the bail to cyclically move the sensing levers into and out of sensing position, and means for advancing the tape following each withdrawal of the sensing levers from the sensing position which comprises a feed wheel, a ratchet connected to the feed wheel, a pawl adapted to cooperate with the ratchet, a lever having mounted thereon said pawl, an operating arm pivotally mounted to engage the bail, a spring interconnecting said lever and arm to urge each toward the other, a latch for engaging the lever whereby the movement of the bail in withdrawing the sensing levers pivots the operating arm to extend the spring, and means operated by the solenoid for disengaging the latch subsequent to a withdrawal of the sensing levers from the sensing position whereby the extended spring moves the lever to advance the pawl over the ratchet to advance the feed wheel.

References Cited in the file of this patent

UNITED STATES PATENTS

| | | |
|---|---|---|
| 1,298,440 | Benjamin | Mar. 25, 1919 |
| 2,293,077 | Potts | Aug. 18, 1942 |
| 2,320,788 | Mills et al. | June 1, 1943 |
| 2,619,532 | Blodgett | Nov. 25, 1952 |